United States Patent
Anderson et al.

(10) Patent No.: US 9,244,729 B1
(45) Date of Patent: *Jan. 26, 2016

(54) DYNAMIC DISTRIBUTION FOR DISTRIBUTED ARRAYS AND RELATED RULES

(71) Applicant: The MathWorks, Inc., Natick, MA (US)

(72) Inventors: Penelope Anderson, Newton, MA (US); Cleve Moler, Santa Fe, NM (US); Sheung Hun Cheng, Brookline, MA (US); Patrick D Quillen, Northborough, MA (US)

(73) Assignee: The MathWorks, Inc., Natick, MA (US)

( * ) Notice: Subject to any disclaimer, the term of this patent is extended or adjusted under 35 U.S.C. 154(b) by 264 days.

This patent is subject to a terminal disclaimer.

(21) Appl. No.: 13/955,152

(22) Filed: Jul. 31, 2013

Related U.S. Application Data (63) Continuation of application No. 13/163,169, filed on Jun. 17, 2011, now Pat. No. 8,510,366, which is a continuation of application No. 12/778,746, filed on May 12, 2010, now Pat. No. 7,987,227, which is a continuation of application No. 11/387,565, filed on Mar. 22, 2006, now Pat. No. 7,743,087.

(51) Int. Cl.
  *G06F 15/16* (2006.01)
  *G06F 9/48* (2006.01)
  *G06F 9/50* (2006.01)
  *G06F 15/80* (2006.01)
  *G06F 9/00* (2006.01)

(52) U.S. Cl.
  CPC ............ *G06F 9/4806* (2013.01); *G06F 9/5066* (2013.01); *G06F 9/00* (2013.01); *G06F 15/80* (2013.01)

(58) Field of Classification Search
  CPC .......... G06F 9/5066; G06F 15/80; G06F 9/00
  USPC .......... 709/201–202, 248–250; 717/103–104, 717/149–151
  See application file for complete search history.

(56) References Cited

U.S. PATENT DOCUMENTS

| | | | |
|---|---|---|---|
| 5,414,849 | A | 5/1995 | Yamamoto |
| 5,450,313 | A | 9/1995 | Gilbert et al. |
| 5,488,727 | A | 1/1996 | Agrawal et al. |
| 5,696,973 | A | 12/1997 | Agrawal et al. |

(Continued)

FOREIGN PATENT DOCUMENTS

EP   0 408 200 A2   1/1991

OTHER PUBLICATIONS

Akarsu et al., "Particle-in-Cell Simulation Codes in High Performance Fortran", IEEE, (1996) 23 pages.

(Continued)

*Primary Examiner* — Bharat N Barot
(74) *Attorney, Agent, or Firm* — Harrity & Harrity, LLP (57) ABSTRACT

The present invention provides a method and system for the dynamic distribution of an array in a parallel computing environment. The present invention obtains a criterion for distributing an array and performs flexible portioning based on the obtained criterion. In some embodiment analysis may be performed based on the criterion. The flexible portioning is then performed based on the analysis.

38 Claims, 4 Drawing Sheets

(56) References Cited

U.S. PATENT DOCUMENTS

| | | | |
|---|---|---|---|
| 5,701,482 A | 12/1997 | Harrison et al. | |
| 5,721,928 A | 2/1998 | Umehara et al. | |
| 5,781,777 A | 7/1998 | Sato et al. | |
| 5,845,126 A | 12/1998 | Ju et al. | |
| 6,021,442 A | 2/2000 | Ramanan et al. | |
| 6,374,403 B1 | 4/2002 | Darte et al. | |
| 6,381,734 B1 | 4/2002 | Golde et al. | |
| 6,415,434 B1 | 7/2002 | Kind | |
| 6,427,231 B1 | 7/2002 | Burke et al. | |
| 6,480,833 B2 | 11/2002 | Kaneko et al. | |
| 6,487,714 B1 | 11/2002 | Azagury et al. | |
| 6,782,532 B1 | 8/2004 | Sexton et al. | |
| 6,832,378 B1 | 12/2004 | Beatty, III et al. | |
| 7,065,763 B1 * | 6/2006 | Martin | G06F 9/526 718/102 |
| 7,086,040 B2 | 8/2006 | Joisha et al. | |
| 7,127,701 B2 | 10/2006 | Fables et al. | |
| 7,386,849 B2 | 6/2008 | Dageville et al. | |
| 7,418,470 B2 | 8/2008 | Howard et al. | |
| 7,542,981 B2 | 6/2009 | Choy et al. | |
| 7,543,184 B2 | 6/2009 | Dean et al. | |
| 7,590,984 B2 | 9/2009 | Kaufman et al. | |
| 7,634,530 B2 | 12/2009 | Dean et al. | |
| 7,725,679 B1 | 5/2010 | Anderson et al. | |
| 7,743,087 B1 | 6/2010 | Anderson et al. | |
| 7,769,803 B2 | 8/2010 | Birdwell et al. | |
| 7,797,691 B2 * | 9/2010 | Cockx | G06F 8/456 717/149 |
| 7,987,227 B1 | 7/2011 | Anderson et al. | |
| 8,510,366 B1 * | 8/2013 | Anderson et al. | 709/201 |
| 8,832,177 B1 * | 9/2014 | Anderson et al. | 709/201 |
| 2002/0055931 A1 | 5/2002 | Kaneko et al. | |
| 2003/0126589 A1 | 7/2003 | Poulsen et al. | |
| 2003/0195938 A1 | 10/2003 | Howard et al. | |
| 2003/0208322 A1 * | 11/2003 | Aoki | G06F 19/26 702/19 |
| 2007/0239797 A1 * | 10/2007 | Cattell | G06F 17/30306 707/999.201 |

OTHER PUBLICATIONS

Rossum, "Python Tutorial", Computer Science/Department of Algorithmics and Architecture, Version 1.2, Apr. 10, 1995, 71 pages.
Siegelmann et al., "The Allocation of Documents in Multiprocessor Information Retrieval Systems: An Application of Genetic Algorithms", IEEE, (1991) 6 pages.
Lin et al., "Parallel Simulation of 3-D Flow and Transport Models within the NOWESP Project", (1995) 14 pages.
Lippert et al., "FFT for the APE Parallel Computer", International Journal of Modern Physics C, Oct. 16, 1997, 17 pages.
Castagna et al., "A Calculus for Overloaded Functions with Subtyping (extended abstract)", Apr. 8, 1992, 11 pages.
Kavi et al., "A Decoupled Scheduled Dataflow Multithreaded Architecture", (1999) 6 pages.
Rana et al, "A Distributed Framework for Parallel Data Mining Using HP Java", BT Technology Journal, vol. 17, Issue 3, Jul. 1999, 9 pages.
Xu et al., "A Fast Parallel Clustering Algorithm for Large Spatial Databases", Data Mining and Knowledge Discovery, 3, pp. 263-290 (1999).
Gupta et al., "A Framework for Generating Distributed-Memory Parallel Programs for Block Recursive Algorithms", Journal of Parallel and Distributed Computing 34, Article No. 0051, pp. 137-153 (1996).
Merten, "A Framework for Profile-Driven Optimization in the Impact Binary Reoptimization System", 1999, 87 pages.
Veaven et al., "A Functional Language with Classes", Purdue University, Computer Science Technical Reports, Department of Computer Science, Jan. 10, 1990, 29 pages.
"Type Id= String.strings", Jan. 21, 1990, 4 pages.
Sharma, "A Generic Machine for Parallel Information Retrieval", Information Processing & Management vol. 25, No. 3, pp. 223-235 (1989).
Dotsenko et al., "A Multi-Platform Co-Array Fortran Compiler", Proceedings of the International Conference Parallel Architecture and Compilation Techniques (PACT), Sep. 2004, 12 pages.
Jenks et al., "A Multithreaded Runtime System with Thread Migration for Distributed Memory Parallel Computing", (2003) 9 pages.
Appelbe et al., "A New Algorithm for Global Optimization for Parallelism and Locality", (1994) 16 pages.
Du et al., "A Novel Parallelization Approach for Hierarchical Clustering", Parallel Computing 31 (2005) pp. 523-527.
Krishnan et al., "A Parallel Array Abstraction for Data-Driven Objects", (1996) 5 pages.
Davidson, "A Parallel Processing Tutorial", IEEE Antennas and Propagation Society Magazine, Apr. 1990, 14 pages.
Arapov et al., "A Programming Environment for Heterogeneous Distributed Memory Machines", IEEE, (1997) 14 pages.
Adams et al., "A Review of Parallel Processing for Statistical Computation", Statistics and Computing (1996) pp. 37-49.
Hiranandani et al., "A Scheme for Supporting Distributed Data Structures on Multicomputers", NASA Contractor Report 181987, ICASE Interim Report 9, NASA Contract No. NAS1-18605, Jan. 1990, 14 pages.
Bringmann, "A Template for Code Generator Development Using the Impact-I C Compiler", 1983, 61 pages.
Merlin, "ADAPTing Fortran 90 Array Programs for Distributed Memory Architectures", Proceedings of the $1^{st}$ International Conference of the Austrian Centre for Parallel Computation, Sep. 1991, 17 pages.
Lastovetsky et al., "Adaptive Parallel Computing on Heterogeneous Networks with mpC", Parallel Computing 28 (2002) pp. 1369-1407.
Yuan et al., "Algorithms for Supporting Compiled Communication", Feb. 2003, 31 pages.
Wu et al., "An Efficient Parallel-Computing Method for Modeling Nonisothermal Multiphase Flow and Multicomponent Transport in Porous and Fractured Media", Advances in Water Resources 25 (2002) pp. 243-261.
Chavarria-Miranda et al. "An Evaluation of Data-Parallel Compiler Support for Line-Sweep Applications", Proceedings of the 2002 International Conference on Parallel Architectures and Compilation Techniques (PACT'02) 2002, 11 pages.
Chavarría-Miranda et al. "An Evaluation of Data-Parallel Compiler Support for Line-Sweep Applications", Journal of Instruction-Level Parallelism 5 (2003) pp. 1-29.
Jenks, "An Evaluation of Thread Migration for Exploiting Distributed Array Locality", (2002) 6 pages.
Brezany, "Input/Output Intensive Massively Parallel Computing", (1997) 13 pages.
Rossum et al., "Extending and Embedding the Python Interpreter", Apr. 15, 2001, 4 pages.
Narayanan et al., "Database Support for Data-Driven Scientific Applications in the Grid", (2003) 21 pages.
Wonnacott, "Using Accessory Functions to Generalize Dynamic Dispatch in Single-Dispatch Object-Oriented Languages", (2001) 10 pages.
Wilson, "Uniprocessor Garbage Collection Techniques", (1992) 67 pages.
Wadler et al., "How to Make *Ad-Hoc* Polymorphism less *Ad Hoc*", Oct. 1988, 17 pages.
Harris et al., "Compiling High Performance Fortran for Distributed-Memory Systems", Digital Technical Journal, vol. 7, No. 3, (1995) 19 pages.
Mazumder, "Parallel VLSI-Routing Models for Polymorphic Processors Array", IEEE (1996) 5 pages.
Benkner et al., "Vienna Fortran 90", IEEE (1992) 9 pages.
Ujaldon et al., "Vienna Fortran/HPF Extensions for Sparse and Irregular Problems and Their Compilation", Technical Report No. UMA-DAC-97/26, Oct. 1997, 42 pages.
Chapman et al., "Vienna Fortran—A Fortran Language Extension for Distributed Memory Multiprocessors", NASA Contractor Report 187634, ICASE Report No. 91-72, Contract No. NAS1-18605, Sep. 1991, 34 pages.
Botorog et al., "Using Algorithmic Skeletons with Dynamic Data Structures", (1996) 14 pages.

(56) References Cited

OTHER PUBLICATIONS

Gerndt, "Updating Distributed Variables in Local Computations", Concurrency: Practice and Experience, vol. 2(3), Sep. 1990, 23 pages.
Chavarría-Miranda et al., "Topology-Aware Tile Mapping for Clusters of SMPs", ACM, (2005) 9 pages.
O'Brien et al., "The Trellis Programming Environment", Digital Equipment Corporation, OOPSLA '87 Proceedings, Oct. 4-8, 1987, 12 pages.
Andersen et al., "The Scheduling of Sparse Matrix-Vector Multiplication on a Massively Parallel DAP Computer", Jul. 1991, 36 pages.
Ngo, "The Role of Performance Models in Parallel Programming and Languages", (1997) 196 pages.
Szykman et al., "The Representation of Function in Computer-Based Design", Proceedings of the 1999 ASME Design Engineering Technical Conferences, Sep. 12-15, 1999, 15 pages.
Kuchen et al., "The Integration of Task and Data Parallel Skeletons", Parallel Processing Letters, vol. 12, No. 2 (2002) pp. 141-155.
Fraguela et al., "The Hierarchically Tiled Arrays Programming Approach", (2004) 12 pages.
Baden et al., "The Data Mover: A Machine-Independent Abstraction for Managing Customized Data Motion", Jul. 8, 1999, 13 pages.
Tucker et al., "Architecture and Applications of the Connection Machine", IEEE, (1988) 13 pages.
Barua et al., "Addressing Partitioned Arrays in Distributed Memory Multiprocessors—the Software Virtual Memory Approach", May 6, 1996, 14 pages.
Ponnusamy et al., "Supporting Irregular Distributions Using Data-Parallel Languages", IEEE, (1995) 13 pages.
Huang et al., "Support for Adaptivity in ARMCI Using Migratable Objects", IEEE (2006) 9 pages.
Brezany et al., "SUPERB Support for Irregular Scientific Computations", (1992) 8 pages.
Stroustrup, "The C++ Programming Language—Third Edition and Special Edition", http://www.research.att.com/-bs/3rd.html, Dec. 30, 2002, 5 pages.
Stroustrup, What is "Object-Oriented Programming"?, AT&T Bell Laboratories, (1991 revised version) 21 pages.
Stroustrup, "A Perspective on ISO C++", AT&T Bell Laboratories, (1995) 8 pages.
Stroustrup, "A Brief Look at C++", AT&T Bell Laboratories, (2006) 4 pages.
Stroustrup, "The C++ Programming Language—$3^{rd}$ Edition", AT&T Labs, (1997) 924 pages.
Strachey, "Fundamental Concepts in Programming Languages", Higher-Order and Symbolic Computation, 13 (2000) pp. 11-49.
Passoni et al., "Analysis and Implementation of a Parallelization Strategy on a Navier-Stokes Solver for Shear Flow Simulations", Apr. 3, 2001, 21 pages.
Moreira et al., "Design and Implementation of Computational Steering for Parallel Scientific Applications", 1996, 14 pages.
Steele Jr., "Common Lisp—The Language", $2^{nd}$ Edition, Jun. 15, 1990, 1096 pages.
Silicon Graphics, Inc., "Star-P® User Guide", Version 005, Jan. 2006, 190 pages.
Agrawal et al., "Interprocedural Data Flow Based Optimizations for Distributed Memory Compilation", (1997) 30 pages.
Choudhary et al., "Software Support for Irregular and Loosely Synchronous Problems", CRPC-TR92258, May 1992, 25 pages.
Botorog et al., "Skil: An Imperative Language with Algorithmic Skeletons for Efficient Distributed Programming", (1996) 10 pages.
Abelson et al., "Structure and Interpretation of Computer Programs", Second Edition, (1996) 634 pages.
Hwang et al., "Runtime Support to Parallelize Adaptive Irregular Programs", (1994) 14 pages.
Ponnusamy et al., "Runtime Support and Compilation Methods for User-Specified Data Distributions", NASA Contractor Report 191587—ICASE Report No. 93-99, Contract No. NAS1-19480, Dec. 1993, 38 pages.
Ponnusamy et al., "Runtime Compilation Techniques for Data Partitioning and Communication Schedule Reuse", (1993) 10 pages.
Hwang et al., "Runtime and Language Support for Compiling Adaptive Irregular Programs on Distributed-Memory Machines", Software—Practice and Experience, vol. 25, Jun. 1995, pp. 594-621.
Sharma et al., "Run-time and Compile-time Support for Adaptive Irregular Problems", (1994) 26 pages.
Chen et al., "Redundant Computation Partition on Distributed-Memory Systems", Proceedings of the Fifth International Conference on Algorithms and Architectures for Parallel Processing (ICA3PP'02) IEEE, (2002) 9 pages.
Rossum, "Python Reference Manual", Release 2.0, Oct. 16, 2000, 69 pages.
O'Boyle et al., "Expert Programmer Versus Parallelising Compiler: A Comparative Study of Two Approaches for Distributed Shared Memory", (1996) 29 pages.
Moreira et al., "A Programming Environment for Dynamic Resource Allocation and Data Distribution", (1996) 17 pages.
Su et al., "Processor Tagged Descriptors: A Data Structure for Compiling for Distributed-Memory Multicomputers", Conference on Parallel Architectures and Compilation Techniques, Aug. 1994, 10 pages.
Gebremedhin et al., "Pro: A Model for the Design and Analysis of Efficient and Scalable Parallel Algorithms", Nordic Journal of Computing 13(2006) 25 pages.
Bader et al, "Practical Parallel Algorithms for Dynamic Data Redistribution, Median Finding, and Selection", Proceedings of the $10^{th}$ International Parallel Processing Symposium (IPPS) 1996, IEEE, 10 pages.
Ngo et al., "Portable Performance of Data Parallel Languages", (1997) 20 pages.
Taura et al., "Phoenix: a Parallel Programming Model for Accommodating Dynamically Joining/Leaving Resources", Jun. 11-13, 2003, 14 pages.
Fahringer et al., "Evaluation of $P^3T+$: A Performance Estimator for Distributed and Parallel Applications", (2000) 6 pages.
Mattson et al., "Patterns for Parallel Programming", ISBN—13: 978-0321228116, (2004) 33 pages.
Sussman et al., "PARTI Primitives for Unstructured and Block Structured Problems", (1992) 28 pages.
Kaes, "Parametric Overloading in Polymorphic Programming Languages", (1988) 14 pages.
Andre et al, "Parallelization of Wave Propagation Application using a Data Parallel Compiler", (1995) 6 pages.
Chase et al., "Parallelization of Irregularly Coupled Regular Meshes", NASA Contractor Report 189598—ICASE Report No. 92-1, Contract No. NAS1-18605, Jan. 1992, 26 pages.
Gupta et al., "An HPF Compiler for the IBM SP2", (1995) 18 pages.
Schaffert et al., "An Introduction to Trellis/Owl", OOPSLA '86 Proceedings, Sep. 1986, 8 pages.
Tseng, "An Optimizing Fortran D Compiler for MIMD Distributed-Memory Machines", Rice COMP TR93-199, Jan. 1993, 208 pages.
McBryan, "An Overview of Message Passing Environments", Proceedings of Parallel Computing, Apr. 1994, 36 pages.
Hiranandani et al., "An Overview of the Fortran D Programming System", CRPC-TR 91121, Mar. 1991, 13 pages.
Narayanan et al., "Applying Database Support for Large Scale Data Driven Science in Distributed Environments", (2003) 8 pages.
Chatterjee et al., "Array Distribution in Data-Parallel Programs", (1994) 17 pages.
Clémencon et al., "The "Annai" Environment for Portable Distributed Parallel Programming", Proceedings of $28^{th}$ Hawaii International Conference on System Sciences (HICSS-28), vol. II, IEEE Computer Society Press, Jan. 1995, pp. 242-251.
Darlington et al., "Parallel Skeletons for Structured Composition", (1995) 10 pages.
Mehrotra et al., "Parallel Language Constructs for Tensor Product Computations on Loosely Coupled Architectures", NASA Contractor Report 181900—ICASE Report No. 89-41, Contract No. NAS1-18605, Sep. 1989, 32 pages.
Tandri et al., "Automatic Data and Computation Partitioning on Scalable Shared Memory Multiprocessors", (1996) 17 pages.

(56) References Cited

OTHER PUBLICATIONS

Guo, "Automatic Parallelization and Optimization for Irregular Scientific Applications", Proceedings of the 18th International Parallel and Distributed Processing Symposium (IPDPS '04) 2004, 5 pages.
Brezany et al., "Automatic Parallelization of the AVL FIRE Benchmark for a Distributed-Memory System", (1995) 11 pages.
Tandri et al., "Automatic Partitioning of Data and Computations on Scalable Shared Memory Multiprocessors", (1997) 10 pages.
Moreira, "Autoscheduling in a Distributed Shared-Memory Environment", (1994) 21 pages.
Bobrow et al., "CommonLoops Merging Lisp and Object-Oriented Programming", Proceedings of OOPSLA's 86, (1986) 12 pages.
Cannon, "Flavors—A Non-Hierarchical Approach to Object-Oriented Programming", (1979) 22 pages.
Gupta et al, "Compile-Time Estimation of Communication Costs in Multicomputers", University of Illinois, Technical Report CRHC-91-16, Aug. 1992, 25 pages.
Chase et al., "Compiler and Runtime Support for Irregularly Coupled Regular Meshes", (1992) 9 pages.
Agrawal et al., "Compiler and Runtime Support for Structured and Block Structured Applications", (1993) 10 pages.
Hiranandani et al., "Evaluation of Compiler Optimizations for Fortran D on MIMD Distributed-Memory Machines", (1992) 14 pages.
Abdelrahman et al., "Compiler Support for Array Distribution on NUMA Shared Memory Multiprocessors", Technical Report CSRI-331, Jul. 1995, 36 pages.
Koelbel, "Compile-Time Generation of Regular Communications Patterns", (1991) 10 pages.
Brandes, "Compiling Data Parallel Programs to Message Passing Programs for Massively Parallel MIMD Systems", (1993) 10 pages.
Bozkus et al., "Compiling Fortran 90D/HPF for Distributed Memory MIMD Computers", (1994) 23 pages.
Hiranandani et al., "Compiling Fortan D for MIMD Distributed-Memory Machines", Communications of the ACM, vol. 35, No. 8, Aug. 1992, 15 pages.
Stoffel et al., "Parallel k/h-Means Clustering for Large Data Sets", (1999) 4 pages.
Liu et al., "Computation-Communication Overlap on Network-of-Workstation Multiprocessors", (1998) 8 pages.
Zhang et al., "Considerations in HP Java Language Design and Implementation", Sep. 14, 1998, 20 pages.
Kennedy et al., "Context Optimization for SIMD Execution", CRPC-TR94455-S, May 1994, 10 pages.
Au et al., "Co-ordinating Heterogeneous Parallel Computation", (1996) 14 pages.
Wray et al., "Correct Translation of Data Parallel Assignment onto Array Processors", Formal Aspects of Computing (1994) 23 pages.
Michailidis et al, "Parallel Text Searching Application on a Heterogeneous Cluster of Workstations", Proceedings of the 2001 International Conference on Parallel Processing Workshops (ICPPW '01) 2001, 7 pages.
Haab, "Data Dependence Analysis for Fortran Programs in the Impact Compiler", (1990) 105 pages.
Zumbusch, "Data Parallel Iterators for Hierarchical Grid and Tree Algorithms", (2006) 10 pages.
Narayanan et al, "Database Support for Data-Driven Scientific Applications in the Grid", (2003) 21 pages.
Bangalore, "The Data-Distribution-Independent Approach to Scalable Parallel Libraries", May 1995, 60 pages.
Anderson et al., "Data and Computation Transformations for Multiprocessors", Proceedings of the Fifth ACM SIGPLAN Symposium on Principles and Practice of Parallel Programming (PPoPP), Jul. 19-21, 1995, 13 pages.
Marr, "Descriptive Simplicity in Parallel Computing", (1997) 241 pages.
Mellor-Crummey et al., "Advanced Optimization Strategies in the Rice dHPF Compiler", Concurrency—Practice & Experience, (2001) 28 pages.
Fowler et al., "Dielectric Breakdown in a Simplified Parallel Model", Computers in Physics, vol. 12, No. 5, Sep./Oct. 1998, 10 pages.
Freeh, "Software Support for Distributed and Parallel Computing", (1996) 135 pages.
Mahéo et al., "Distributed Array Management for HPF Compilers", Dec. 1993, 17 pages.
Mahéo et al., "Distributed Array Management for HPF Compilers", 5th Workshop on Compilers for Parallel Computers (1995) 13 pages.
Wu et al., "Distributed Memory Compiler Design for Sparse Problems", IEEE (1995) 48 pages.
Taylor, "Parallel Functional Programming by Partitioning", Sep. 1996, 283 pages.
Das et al., "Distributed Memory Compiler Methods for Irregular Problems—Data Copy Reuse and Runtime Partitioning", NASA Contractor Report 187635 ICASE Report No. 91-73, Contract No. NAS1-18605, Sep. 1991, 38 pages.
Pan et al., "Distributed Parallel Computing Using Navigational Programming", International Journal of Parallel Programming, vol. 32, No. 1, Feb. 2004, 37 pages.
Baugh Jr. et al., "Evaluation of Distributed Finite Element Algorithms on a Workstation Network", Engineering with Computers (1994) 18 pages.
Foster et al., "Double Standards: Bringing Task Parallelism to HPF Via the Message Passing Interface", IEEE (1996) 18 pages.
Shalit, "The Dylan Reference Manual—The Definitive Guide to the New Object-Oriented Dynamic Language", (1996) 17 pages.
Chavarría-Miranda et al., "Effective Communication Coalescing for Data-Parallel Applications", (2005) 12 pages.
Lee et al., "Efficient Communication Between Parallel Programs with InterComm", (2004) 24 pages.
Stichnoth, "Efficient Compilation of Array Statements for Private Memory Multicomputers", Feb. 1993, 53 pages.
Guo, "Efficient Loop Partitioning for Parallel Codes of Irregular Scientific Computations", vol. E86-D, No. 9, Sep. 2003, 10 pages.
Balay et al., "Efficient Management of Parallelism in Object-Oriented Numerical Software Libraries", (1997) 29 pages.
Botorog et al., "Efficient Parallel Programming with Algorithmic Skeletons", (1996) 14 pages.
Ujaldon et al., "Efficient Resolution of Sparse Indirections in Data-Parallel Compilers", Technical Report No. UMA-DAC-95/14, Jul. 1995, 11 pages.
Ponnusamy et al., "Embedding Data Mappers with Distributed Memory Machine Compilers", (1993) 4 pages.
George et al., "Parallel Algorithms for Split-Aperture Conventional Beamforming", Oct. 16, 1998, 16 pages.
Patra et al., "Parallel Adaptive Numerical Simulation of Dry Avalanches Over Natural Terrain", Journal of Volcanology and Geothermal Research 139 (2005) 21 pages.
Bic et al., "Exploiting Iteration-Level Parallelism in Dataflow Programs", IEEE (1992) 6 pages.
Dubois et al., "Extending Python", (1996) 20 pages.
Henrich, "Fast Motion Planning by Parallel Processing—A Review", Journal of Intelligent and Robotic Systems, vol. 20, No. 1, Sep. 1997, 24 pages.
Parashar et al., "Compile-Time Performance Prediction of HPF/Fortran 90D", (1996) 32 pages.
Allen et al., "The Fortress Language Specification", Version 0.618, Apr. 26, 2005, 111 pages.
Rendell et al., "Computational Chemistry on Fujitsu Vector-Parallel Processors: Development and Performance of Applications Software", Parallel Computing 26 (2000) 25 pages.
Darlington et al., "Functional Skeletons for Parallel Coordination", (1995) 19 pages.
Graham, "ANSI Common Lisp", Prentice Hall Series in Artificial Intelligence, (1996) 450 pages.
Chaumette et al., "A Graph Based Framework for the Definition of Tools Dealing with Sparse and Irregular Distributed Data Structures", (1998) 9 pages.
Arnold et al., "Hector: Distributed Objects in Python", Jun. 1996, 13 pages.
Yu et al., "High Performance File I/O for the Blue Gene/L Supercomputer", IEEE (2006) 10 pages.
Adve et al., "High Performance Fortran Compilation Techniques for Parallelizing Scientific Codes", (1998) 23 pages.

(56) References Cited

OTHER PUBLICATIONS

Richardson, "High Performance Fortran: History, Overview and Current Developments", TMC-261, Version: 1.4, Apr. 24, 1996, 25 pages.
Carriero et al., "How to Write Parallel Programs: A Guide to the Perplexed", (1989) 35 pages.
Habiger et al., "Hybrid-WSI: A Massively Parallel Computing Technology?", IEEE (1993) 12 pages.
Das et al., "Index Array Flattening Through Program Transformation", (1995) 25 pages.
Chandy et al., "Integrated Support for Task and Data Parallelism", Aug. 27, 1993, 22 pages.
Chandy et al., "Integrated Task and Data Parallelism with the Group Communication Archetype", (1995) 10 pages.
Agrawal et al., "Interprocedural Compilation of Irregular Applications for Distributed Memory Machines", (1995) 25 pages.
Jeong et al., "Inverted File Partitioning Schemes in Multiple Disk Systems", Oct. 1993, 24 pages.
Doornik et al., "Parallel Computation in Econometrics: A Simplified Approach", Jan. 30, 2003, 32 pages.
Wen et al., "Java Data Parallel Extensions with Runtime System Support", (1998) 5 pages.
Kahan, "Branch Cuts for Complex Elementary Functions or Much Ado About Nothing's Sign Bit", (1987) 24 pages.
Keyser et al., "Load Balancing Data Parallel Programs on Distributed Memory Computers" Parallel Computing 19 (1993) pp. 1199-1219.
Krishnamoorthy et al., "An Approach to Locality-Conscious Load Balancing and Transparent Memory Hierarchy Management with a Global-Address-Space Parallel Programming Model", (2006) 8 pages.
Ierusalimschy et al., "Lua-an Extensible Extension Language", May 15, 1995, 15 pages.
Kessler, "Managing Distributed Shared Arrays in a Bulk-Synchronous Parallel Programming Environment", Concurrency and Computation: Practice and Experience, (2004) 21 pages.
Ahuja et al., "Matching Language and Hardware for Parallel Computation in the Linda Machine", IEEE Transactions on Computers, vol. 37, No. 8, Aug. 1988, 9 pages.
Krishnan et al., "Memory Efficient Parallel Matrix Multiplication Operation for Irregular Problems", (2006) 12 pages.
Thomas et al., "Massively Parallel Implementation of the Mesoscale Compressible Community Model", May 27, 1997, 19 pages.
Meyer, "Object-Oriented Software Construction", Second Edition, (1997) 152 pages.
Milton et al., "Dynamic Dispatch in Object-Oriented Languages", TR-CS-94-02, Jan. 1994, 19 pages.
Bridges et al., "A CPU Utilization Limit for Massively Parallel MIMD Computers", IEEE (1992) 10 pages.
Moses, "The Function of Funcion in LISP or Why the Funarg Problem Should be Called the Environment Problem", Massachusetts Institute of Technology, Project MAC, Jun. 1970, 15 pages.
Saltz et al., "Multiprocessors and Runtime Compilation", NASA Contractor Report 182100 ICASE Report No. 90-59, Contract No. NAS1-18605, Sep. 1990, 28 pages.
Sinha et al., "Parallel Algorithms for Robust Broadband MVDR Beamforming", (2000) 27 pages.
Kebler, "NestStep: Nested Parallelism and Virtual Shared Memory for the BSP Model", Proceedings of the 1999 International Conference on Parallel and Distributed Processing Techniques and Applications (PDPTA '99) Jun. 28-Jul. 1, 1999, 7 pages.
Nieplocha et al., "Advances, Applications and Performance of the Global Arrays Shared Memory Programming Toolkit", International Journal of High Performance Computing Applications, (2006) 30 pages.
Ching et al., "Noncontiguous I/O Accesses Through MPI-IO", Proceedings of the 3rd IEEE/ACM International Symposium on Cluster Computing and the Grid (CCGRID '03) 2003, 8 pages.
Dubois et al., "Numerical Python", (2001) 16 pages.
Odersky et al., "A Nominal Theory of Objects with Dependent Types", (2002) 33 pages.
Heermann et al., "Parallel Algorithms for Statistical Physics Problems", (1995) 22 pages.
Gupta, "On Privatization of Variables for Data-Parallel Execution", (1997) 9 pages.
Frieder et al., "On the Allocation of Documents in Multiprocessor Information Retrieval Systems" (1991) 10 pages.
Graham, "On Lisp", (1993) ISBN 0-13-030552-9, 426 pages.
Allen et al., "Object-Oriented Units of Measurement", Sun Microsystems, Inc., (2004) 61 pages.
Chandra et al., "Optimizing Communication in HPF Programs on Fine-Grain Distributed Shared Memory", (1997), 12 pages.
Kennedy et al., "Optimizing Fortran 90 Shift Operations on Distributed-Memory Multicomputers", Proceedings of the 8th International Workshop on Languages and Compilers for Parallel Computing (LCPC ' 95) Aug. 1995, 15 pages.
Abdelrahman et al., "Overlap of Computation and Communication on Shared-Memory Networks-of-Workstations", (2001) 10 pages.
Narayanan, "Processor Autonomy on SIMD Architectures", (1993) 10 pages.
Quinn et al., "Parallel Graph Algorithms", Computing Surveys vol. 16, No. 3, Sep. 1984, 30 pages.
Chandra et al., "Data Distribution Support on Distributed Shared Memory Multiprocessors", (1997) 12 pages.
Donahue et al., "Data Types Are Values", ACM Transactions on Programming Languages and Systems, vol. 7, No. 3, Jul. 1985, pp. 426-445.
Canning et al., "Interfaces for Strongly-Typed Object-Oriented Programming", OOPSLA '89 Proceedings, Oct. 1-6, 1989, 11 pages.
Reilly, "Presentation Tools for Performance Visualization: The M31 Instrumentation Experience", IEEE, (1990) 7 pages.
Rasmussen et al., "Efficiency of Hierarchic Agglomerative Clustering Using the ICL Distributed Array Processor", Journal of Documentation, vol. 45, Issue 1, Mar. 1989, 24 pages.
Darlington et al., "Structured Parallel Programming: Theory meets Practice", Jul. 21, 1995, 16 pages.
Rasmussen et al., "Searching and Clustering of Databases Using the ICL Distributed Array Processor", Parallel Computing vol. 8, (1988) pp. 399-407.
Nikhil, "Parallel Symbolic Computing in Cid", 1996, pp. 217-242.
Gerndt, "Work Distribution in Parallel Programs for Distributed Memory Multiprocessors", ACM, 1991, pp. 96-104.
Kontoghiorghes et al., "Solving the Updated and Downdated Ordinary Linear Model on Massively Parallel SIMD Systems", Parallel Algorithms and Applications, vol. 1, (1993) pp. 243-252.
Kontoghiorghes et al., "Parallel Reorthogonalization of the QR Decomposition After Deleting Columns", Parallel Computing, vol. 19, (1993) pp. 703-707.
Bozkus et al., "A Compilation Approach for Fortran 90D/HPF Compilers", (1994) pp. 200-215.
Crooks et al., "Language Constructs for Data Partitioning and Distribution", Journal of Scientific Programming, vol. 4, (1995) pp. 59-85.
MacFarlane et al., "Parallel Computing in Information Retrieval—an Updated Review", Journal of Documentation, vol. 53, No. 3, Jun. 1997, pp. 274-315.
Benkner, "Vienna Fortran 90—an Advanced Data Parallel Language", Institute for Software Technology and Parallel Systems, (1995) pp. 142-156.
Dion et al., "Parallelizing Compilers: What Can be Achieved?", (1994) pp. 447-456.
Cantoni et al., "Matching the task to an Image Processing Architecture", Computer Vision, Graphics, and Image Processing, vol. 22, (1983) pp. 301-309.
Howe et al., "Modernization of Legacy Application Software", 1998, pp. 255-262.
Guo et al., "Reducing Communication Cost for Parallelizing Irregular Scientific Codes", Proceedings of the 6th International Conference on Applied Parallel Computing, (2006) 14 pages.
Gerndt, "Parallelization of Multigrid Programs in SUPERB", 1991, pp. 62-72.
Pazat, "Code Generation for Data Parallel Programs on DMPCs", 1991, pp. 337-346.

(56) References Cited

OTHER PUBLICATIONS

Zapata et al., "Software Tools for Multiprocessor Simulation and Programming", Journal of Cybernetics and Systems, vol. 21, (1990) pp. 291-310.

Kumar et al., "The GF11 Parallel Computer", Parallel Computing, vol. 19, (1993) pp. 1393-1412.

Benkner et al., "Compiling High Performance Fortran for Distributed-Memory Architectures", Parallel Computing, vol. 25 (1999) pp. 1785-1825.

Cringean et al., "Efficiency of Text Scanning in Bibliographic Databases using Microprocessor-Based, Multiprocessor Networks", Journal of Information Science, vol. 14, (1988) pp. 335-345.

Bowler et al., "Parallel Computing and Quantum Chromodynamics", Parallel Computing, vol. 25, (1999) pp. 2111-2134.

Kumar et al., "The GF11 Parallel Computer: Programming and Performance", Future Generation Computer Systems, (1991-1992) pp. 169-179.

Odersky et al., "A Second Look at Overloading", $7^{th}$ International Conference on Functional Programming and Computer Architecture, ACM, Jun. 1995, pp. 135-146.

Wu et al., "Runtime Compilation Methods for Multicomputers", Proceedings of the 1991 International Conference on Parallel Processing, vol. II Software, Aug. 12-16, 1991, pp. II-26-II-30.

Pancheco, "Parallel Programming with MPI", Morgan Kaufmann Publishers, Inc., (1997) 418 pages.

Chase et al., "Paragon: A Parallel Programming Environment for Scientific Applications Using Communications Structures", Proceedings of the 1991 International Conference on Parallel Processing, vol. II Software, Aug. 12-16, 1991, pp. II-211-II-218.

Parhami, "Introduction to Parallel Processing—Algorithms and Architectures", Plenum Series in Computer Science, Plenum Press, (1999) 532 pages.

Censor et al., "Parallel Optimization—Theory, Algorithms, and Applications", Oxford University Press, (1997) 539 pages.

Hord, "Parallel Supercomputing in MIMD Architectures", CRC Press, Inc., (1993) 401 pages.

Stroustrup, "The C++ Programming Language—Special Edition", AT&T, (2000) 1019 pages.

The MathWorks, Inc., "Defendant Accelereyes' Local Patent Rule 3.1 Final Unenforceability and Invalidity Contentions", Mar. 6, 2012, 31 pages.

Co-pending U.S. Appl. No. 13/163,169 entitled "Dynamic Distribution for Distributed Arrays and Related Rules", by Anderson et al., filed Jun. 17, 2011, 22 pages.

\* cited by examiner

DYNAMIC DISTRIBUTION FOR DISTRIBUTED ARRAYS AND RELATED RULES

RELATED APPLICATIONS

This application is a continuation of U.S. patent application Ser. No. 13/163,169, filed Jun. 17, 2011, now U.S. Pat. No. 8,510,366, which is a continuation of U.S. patent application Ser. No. 12/778,746, filed May 12, 2010, now U.S. Pat. No. 7,987,227, which is a continuation of U.S. patent application Ser. No. 11/387,565, filed Mar. 22, 2006, now U.S. Pat. No. 7,743,087, disclosures of which are incorporated herein by reference.

TECHNICAL FIELD

The present invention generally relates to parallel computing. More particularly, the present invention relates to dynamic distribution of distributed arrays in the parallel computing environment.

BACKGROUND INFORMATION

MATLAB® is a product of The MathWorks, Inc. of Natick, Mass., that provides an environment for technical computing to engineers, scientists, mathematicians, and educators across a diverse range of industries. MATLAB® is an intuitive high performance language and a technical computing application that provides mathematical and graphical tools for mathematical computation, data analysis, visualization and algorithm development. As a desktop application, MATLAB® typically runs on a single computer. However, there is a limit to the complexity and the size of a problem that a single computer can solve. For example, for a data intensive program utilizing a few 1000 by 1000 arrays, there may not be enough processing power on the single computer to manipulate these arrays, or the program may take days to complete execution. Furthermore, there may not be enough memory on a processor to store one or more of the arrays needed for a data intensive program.

With many engineering and scientific problems requiring larger and more complex modeling, many scientists and engineers are interested in using parallel computing to solve their problems. Arrays are an integral part of technical computing and with distributed arrays, a user can employ more computing resources than with a single computer. U.S. patent application Ser. No. 11/173,645 discusses implementations of distributed arrays focused on evenly distributing arrays across multiple parallel processors. Flexible partitioning removes the limitation of having to evenly distribute the arrays across the parallel processors but introduces additional complexity in determining how an array is to be distributed.

Therefore, it is desirable to provide a technique that reduces the complexity in determining how arrays are partitioned to distribute them across multiple parallel processors.

SUMMARY OF THE INVENTION

The present invention relates in general to parallel computing. Specifically, the present invention is related to dynamic distribution of arrays in parallel computing in a technical computing environment. Operations performed on such distributed arrays are handled using flexible partitioning of the distributed array based on one or more criteria. Based on the established criterion, a partitioning scheme is used to perform a given operation. In some embodiments, rule sets are used to determine how distributed arrays are partitioned in performing an operation. The present invention provides a methodology for partitioning distributed arrays based on one or more goals established by one or more criteria.

In one aspect of the present invention, a method is provided for dynamically distributing arrays in a parallel computing environment. The method includes the steps of obtaining a criterion for the processing of such a distributed array and performing flexible partitioning based on obtained criteria. In certain embodiments, the method further includes performing analysis based on the criterion obtained. The criterion, how the flexible portioning is performed, and the analysis performed based on the criterion may each be specified by a user. In one embodiment of the invention, there may be predefined rules for partitioning arrays based on the desired criteria. Such rules may address the functions and manipulations with the arrays and what should be done in particular classes or individual operations. Certain embodiments of the present invention deal with the desire to minimize the communications between the processors as one of the criteria in distributing the arrays. Minimizing the communications may improve the overall performance.

In another aspect of the present invention, a computer-readable medium for holding instructions for dynamically distributing arrays in a parallel computing environment is provided. The instructions include the steps of obtaining a criterion for the distribution of an array, and performing flexible partitioning based on obtained criterion. In certain embodiments, the instructions further include the step of performing analysis based on the obtained criterion. The criterion, how the flexible portioning is performed, and the analysis performed based on the criterion may each by specified by a user.

In still another embodiment of the present invention, a system is provided for dynamically distributing arrays in a parallel computing environment. The system includes an application providing a parallel computing environment, a first parallel computing unit executing in the parallel computing environment, a second parallel computing unit executing in the parallel computing environment, and a dynamic distribution scheme for partitioning an array for distribution across the first and second parallel computing units based on an obtained criterion. In certain embodiments the dynamic distribution scheme, or portions thereof may be specified by a user The details of various embodiments of the invention are set forth in the accompanying drawings and the descriptions below.

BRIEF DESCRIPTION OF THE DRAWINGS

The foregoing and other objects, aspects, features, and advantages of the invention will become more apparent from the following description and accompanying drawings, in which like reference characters refer to the same parts throughout the different views.

DETAILED DESCRIPTION

The present invention provides a system and method for dynamically distributing an array in a parallel computing environment. In one aspect, the present invention is related to a method to execute a computer program in multiple execution environments. For a computer program utilizing a distributed array, the distributed array may be dynamically distributed across the multiple execution environments and each execution environment handles execution and calculation only for a portion of the distributed array. This provides an easy method for parallel processing of a distributed array executing on multiple computers and/or multiple processors to leverage the computing power of multiple computing resources. The automatic distribution also helps eliminate the requirement that the user of the parallel computing environment understand how to program parallel programming paradigms as well as how to best distribute or partition the distributed array.

With the availability of parallel computers, researchers and scientists are interested in parallel computing in a technical computing environment, such as, for example, MATLAB®. Arrays are an integral part of technical computing and in modern-day computation a single array may be large enough that an improvement in speed and latency may be achieved by distributing the single array across multiple computing resources. As used herein, arrays include matrices and multidimensional grids such as look-up tables.

With distributed arrays, a user can employ more computing resources than with a single computer. However, the implementation of the distributed arrays can affect the complexity of a computer program and user-visible side effects and performance. With identical low level parallel programming paradigms, different top level programming syntaxes can result in a very different user experience.

Figure 1A:
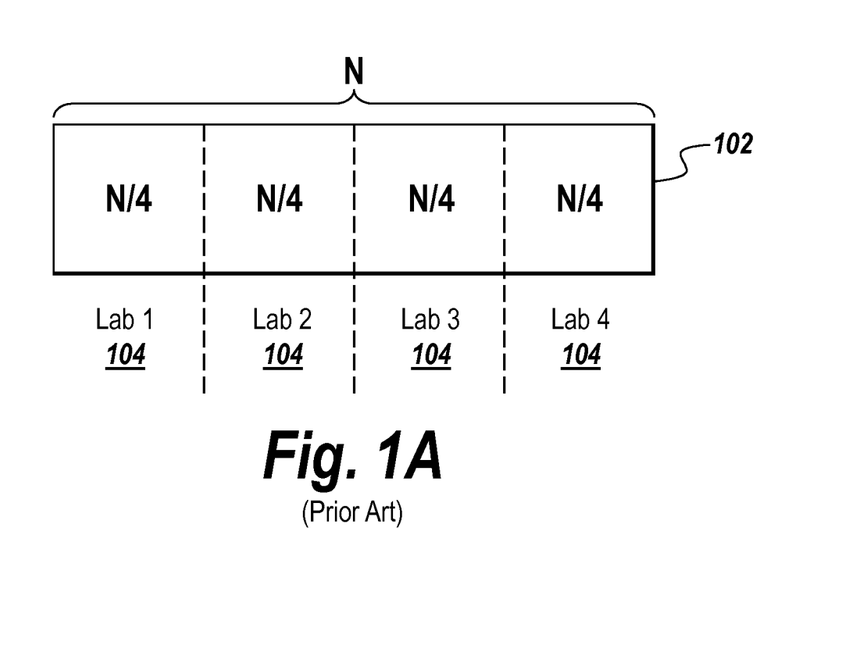
FIG. 1A is an exemplary depiction of a prior art distributed array evenly distributed across multiple processing units.

In U.S. patent application Ser. No. 11/173,645, a distributed array implementation for a parallel version of MATLAB has been introduced. The distribution scheme considered there largely addresses evenly distributing or partitioning the distributed array across the parallel processing units. The processing units may also be referred to as "labs." An example of even distribution can be seen in FIG. 1A. Here, a distributed array 102 having dimensionality of N is distributed over four (4) processing units or labs 104 with each partitioned as having N/4 of the distributed array 102.

Figure 1B:
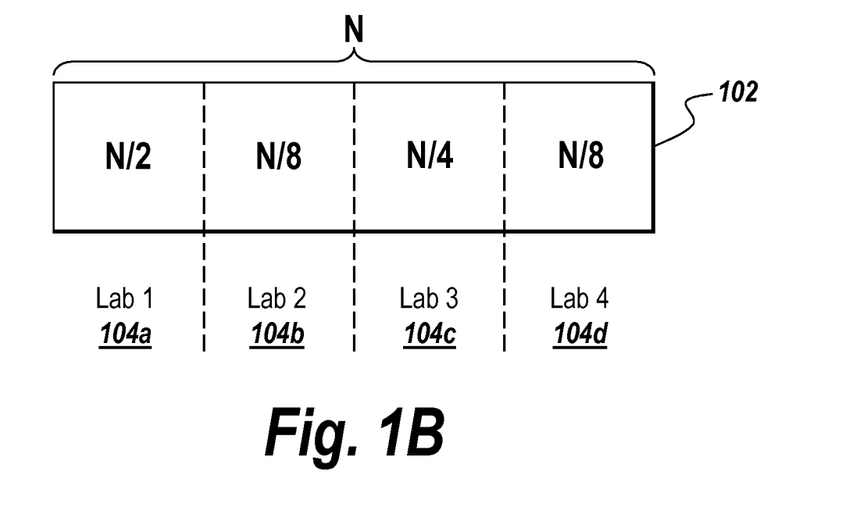
FIG. 1B is an example depiction of a distributed array wherein the distribution is not even across multiple processing units.

Flexible partitioning is built upon this concept and allows non-even distribution partitioning. An example of this can be seen in FIG. 1B. Here, the distributed array 102 having dimensionality N is again distributed across four (4) labs 104a, 104b, 104c, 104d. But, in this example the distributed array 102 is partitioned so that Lab 1 104a handles N/2 of the distributed array 102, Lab 2 104b handles N/8 of the distributed array 102, Lab 3 104c handles N/4 of the distributed array 102, and Lab 4 104d handles N/8 of the distributed array 102. The advantage of such flexible partitioning is that Lab 1 104a may have more resources available for processing so it can handle a larger portion on distributed array 102 while Labs 2 104b and Lab 4 104d have fewer resources available for processing, which necessitates Lab 2 104b and Lab4 104d handling smaller portions of the distributed array 102. It will be understood that resource management is but one of several possible factors that flexible partitioning can be based upon. A disadvantage of flexible partitioning is that it now introduces nearly limitless possibilities for distribution of arrays and the processing of distributed arrays that compounds the complexity issue that distributed arrays were created to address.

The present invention addresses the above-mentioned problems by using one or more criteria to guide how flexible partitioning is to be handled in a parallel processing environment. In one aspect of the present invention, one or more criteria are considered for directing the handling of flexible partitioning. Thus, an array may be dynamically distributed based on the one or more criteria.

The illustrated embodiments will be described for illustrative purposes relative to a MATLAB® based application, however one of ordinary skill in the art will appreciate that the present invention may be applied to parallel execution of other applications such as LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc. The illustrative embodiment may also be applied in graphical modeling environments such as Simulink® for MATLAB®.

Figure 2:
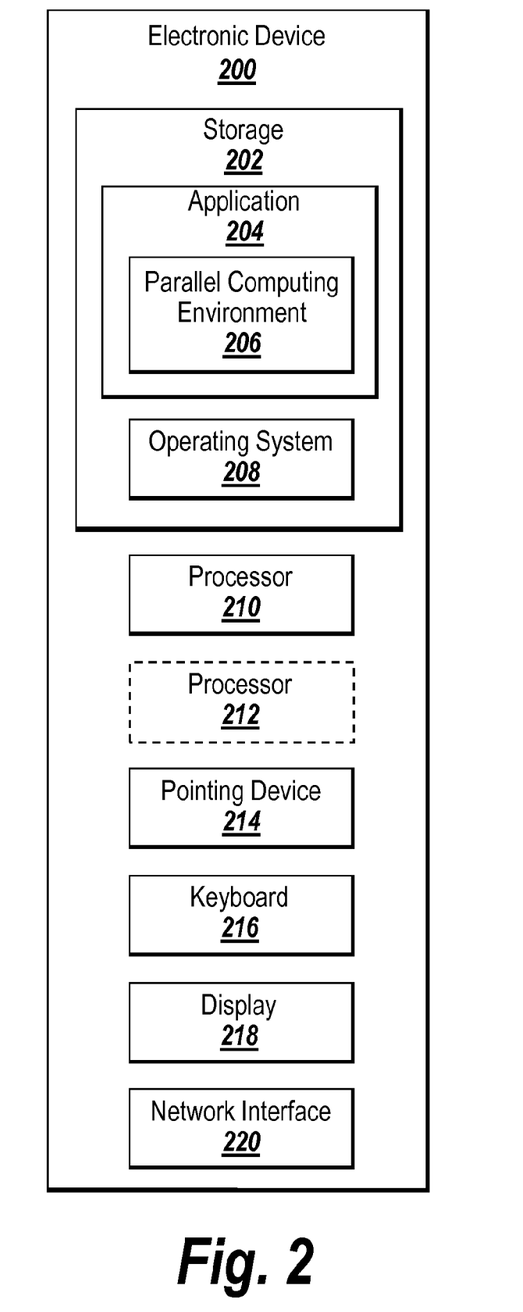
FIG. 2 is an exemplary computing device that is suitable for practicing one embodiment of the present invention.

FIG. 2 illustrates an exemplary computing device that is suitable for practicing an illustrative embodiment of the present invention. Computing device 200 includes storage 202, such as a hard drive or CD-ROM, for storing application 204 and operating system 208. Computing device 200 may be any computer system such as a desktop computer, laptop, workstation, server, handheld computer, or other form of computing or telecommunication device that is capable of communication and that has sufficient computing power to perform the operations described herein. Computing device 200 further includes a display 218 which a user may interact with computing device 200 using I/O devices such as a keyboard 216 and a pointing device 214 such as a mouse or stylus. A first processor 210 and optionally a second processor 212 are utilized by computing device 200 for running operating system 208, application 204, and other software in storage 202. One of ordinary skill in the art will appreciate that first and second processors 210 and 212 may be multiple core processors, multiple processors, other hardware component with computational capability, such as a microcontroller, application specific integrated circuit, field-programmable gate arrays, virtual machines or the like or any combination thereof.

Application 204 provides a parallel computing environment 206 that allows parallel processing of application 204 on the first and second processors 210 and 212. Application 204 is illustrated here as Parallel MATLAB® or a MATLAB® based application that is suitable for parallel or distributed processing. However, one of ordinary skill in the art will appreciate that the present invention may apply to other technical computing environments suitable for parallel or distributed processing. Computing device 200 may further include a network interface 220 to interface to a Local Area Network (LAN), Wide Area Network (WAN), or the Internet through a variety of connections including, but not limited to, standard telephone lines, LAN or WAN links, broadband connections, wireless connections, or some combination of any or all of the above. The network interface 220 allows computing device 200 to interface with another computing device that is capable of executing in the parallel computing environment to allow parallel processing on multiple computing devices.

Figure 3A:
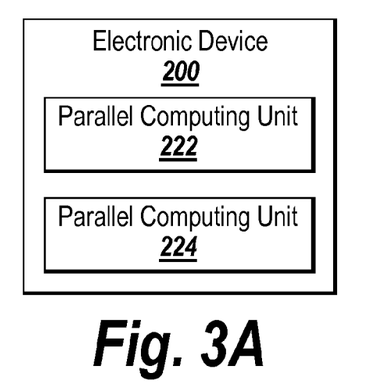
FIG. 3A is a block diagram of an exemplary distributed computing environment that is suitable to practice an embodiment of the present invention in a single computing device.

FIG. 3A illustrates a tightly coupled environment that is suitable for practicing the present invention. Computing device 200 includes a first parallel computing unit 222 and a second parallel computing unit 224. In this embodiment, a parallel computing unit may be a processor, a multiple core processor, multiple processors, or other hardware component with computational capability, such as a microcontroller, application specific integrated circuit, or field-programmable gate arrays.

Figure 3B:
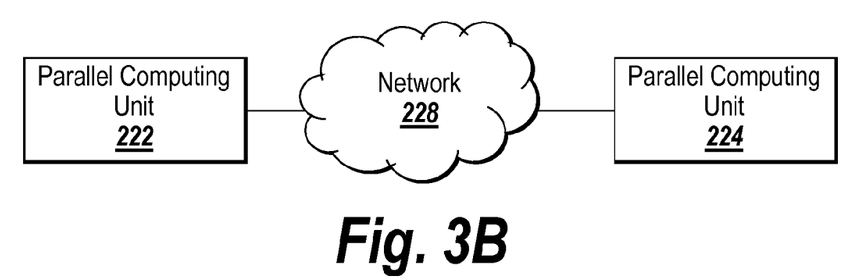
FIG. 3B is a block diagram of another exemplary distributed computing environment that is suitable to practice one embodiment of the present invention via a network.

FIG. 3B illustrates another embodiment that is suitable to practice another exemplary parallel computing environment of the present invention. First parallel computing unit 222 communicates with second parallel computing unit 224 via network 228 such as a LAN, WAN, or wireless network. In this embodiment, a parallel computing unit may be a computing device such as computing device 200, a cluster of workstations or the like. One of ordinary skill in the art will appreciate that a distributed computing environment may comprise a combination of both embodiments illustrated in FIG. 3A and FIG. 3B as well as any number of parallel computing units.

In either of the embodiments shown in FIG. 3A and FIG. 3B, the first parallel computing unit 222 manages a first execution environment or lab and the second parallel computing unit 224 manages a second execution environment or lab. Each execution environment has a local copy of a computer program that is executed in the corresponding parallel computing unit, so there is no main parallel computing unit that distributes executions to the other parallel computing units.

The first execution environment and second execution environment are capable of communicating with each other via an interface. In an exemplary embodiment, the first execution environment and the second execution environment can communicate with each other by sending messages via a Message Passing Interface (MPI). MPI is a de facto standard for communication among the nodes running a parallel program on a distributed memory system. Implementation of the MPI specification permits programs with separate address spaces to synchronize with one another and move data from the address space of one process to that of another by sending and receiving messages. In another embodiment, the first and second execution environments may interface via socket based communications over TCP/IP implementing a custom message specification or other available message communications projects that allow the execution environments to send and receive messages.

A distributed array is implemented such that the executions of the distributed array are distributed or partitioned among the multiple execution environments or labs. Each of the parallel computing units stores locally a partitioned portion of the data contents of the distributed array. The multiple execution environments know which portion of the distributed array is stored on which of the multiple parallel computing units. A parallel computing unit performs execution only on the portion of the distributed array that is stored locally and if the parallel computing unit needs some portion of the distributed array that is not stored locally, it can send a message to other parallel computing units to request for the information needed.

In some embodiments, platform independent technology may be leveraged to achieve the distributed computations. For example, dynamic distribution may be performed on top of any general purpose scheduler. As such, no specific tailoring to the hardware is required at the user level. This enables the distribution to be achieved on heterogeneous clusters that may include different types of hardware and operating systems, as long as the scheduler and the application support them.

Flexible partitioning allows a distributed array to be partitioned across multiple execution environments or labs in any number of ways. In one embodiment of the present invention, a method is provided for dynamically distributing arrays in a parallel computing environment as shown in the flow diagram 400 of FIG. 4. In this example, the method comprises obtaining a criterion for the processing of a distributed array (step 410) and performing flexible partitioning based on obtained criterion (step 430). In certain embodiments, the method further comprises performing analysis based on the obtained criteria.

The criterion acts as a guideline for how flexible partitioning should be handled. The distribution scheme is selected based on the criterion. In one exemplary embodiment the criterion comprises minimizing communication in the parallel computing environment. In order to achieve this goal, flexible distribution schemes are used. It should be understood that this is just one of the possible criteria. Other examples include, but are not limited to, maximizing use of execution environment resources, minimizing processing time, and profiling history. In certain embodiments multiple criteria may be obtained. In some embodiments where multiple criteria are obtained, a weighting scheme may be employed giving some criteria priority over others. Other possible criteria and embodiments will be apparent to one skilled in the art given the benefit of this disclosure.

The obtained criterion may be a default criterion or specified. In the current example, the criterion of minimizing communication in the parallel computing environment is a default criterion provided for handling flexible distribution of arrays provided by a parallel processing environment. In some embodiments of the invention, a criterion may be specified by a user, for example via a graphical user interface. In some such embodiments, the user may be prompted to select a criterion from pre-existing criterion choices. In other embodiments the criterion is specified by the parallel processing environment, the processing unit, other applications running on the processing unit, or other applications of devices in communication with the processing unit and environment. In some embodiments, a new criterion may be specified or provided. This allows for the extensibility of the present invention for as new situations or conditions occur new criterion may be created to address them. In certain embodiments, criteria may be provided via an Application Programming Interface (API). Other possible embodiments and configurations will be apparent to one skilled in the art given the benefit of this disclosure.

Once a criterion is obtained (step 410) then flexible partitioning may be performed based on the obtained criterion (step 430). In certain embodiments the flexible partitioning is performed according to instructions determined the criterion. In some instances the instructions may be the commands used to achieve the desired partitioning. In still further examples, the instructions may comprise the code for implementing a distribution scheme.

As with the criterion, the instructions may be default or specified by an operator such as user, device, or application. That is, once a criterion is obtained, a default set of instructions associated with the selected criterion may then be used or a new set of instruction may be provided for the selected criterion. In other embodiments where a new criterion is specified, instruction for implementing flexible partitioning in accordance with the new criterion may also be specified. In certain embodiments, criteria and corresponding instructions may be provided via an Application Programming Interface (API). Other embodiments and implementations will be apparent to one skilled in the art given the benefit of this disclosure.

Figure 4:
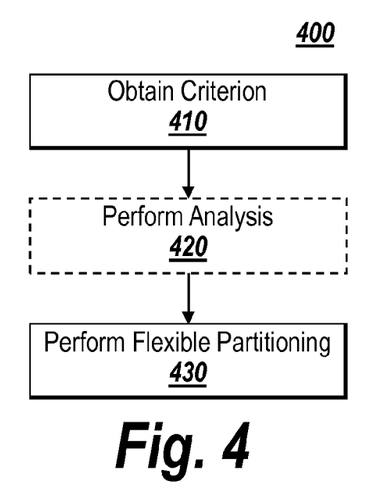
FIG. 4 is a flow diagram depicting an illustrative embodiment of a method of the present invention.

In one embodiment of the invention, the method shown in FIG. 4 further comprises the step of performing analysis based the criterion to determine how to perform flexible partitioning (step 420). In certain embodiments the analysis may also be performed as flexible partitioning is performed to allow for further adjustment to the dynamic distribution. As with the criterion and instructions, the analysis performed may be default or specified by an operator such as user, device, or application. That is, once a criterion is obtained a default analysis associated with the selected criterion may then be performed or a new analysis to be performed may be provided for the selected criterion. In other embodiments where a new criterion is specified, an analysis to be performed in accordance with the new criterion may also be specified. In certain embodiments, the analysis to be provided may be provided via an Application Programming Interface (API). Other embodiments and implementations will be apparent to one skilled in the art given the benefit of this disclosure. The flexible partitioning performed (step 430) may then be based on the results of the analysis. In some embodiments this may include determining the instructions to be used for implementing the flexible partitioning.

In some embodiments, the analysis (step 420) is performed using a rule set. The rules set may be rules for performing the analysis or rules performed as part of the analysis. The rule set may be default or specified by an operator such as user, device, or application. That is, once a criterion is obtained a default rule set associated with the selected criterion or performed analysis may then be utilized or a new rule set may be provided for the selected criterion or analysis. In other embodiments where a new criterion or analysis is specified, a new rule set in accordance with the new criterion or analysis may also be specified. In certain embodiments, the rule set may be provided via an Application Programming Interface (API). Other embodiments and implementations will be apparent to one skilled in the art given the benefit of this disclosure. The flexible partitioning performed (step 430) may then be based on the rule set. In some embodiments this may include determining the instructions to be used for implementing the flexible partitioning.

Figure 5:
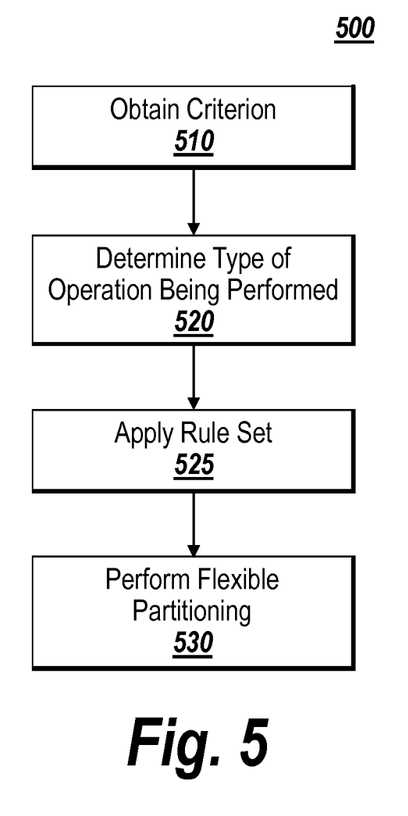
FIG. 5 is a flow diagram depicting another illustrative embodiment of a method of the present invention.

In some embodiments, the step of performing an analysis (step 420) comprises determining the type of operation to be performed on a distributed array. In some further embodiments, the determination of the type of operation to be performed on a distributed array determines a rule set to be used to perform flexible partitioning. An exemplary embodiment of this methodology can be seen in the flow diagram 500 of FIG. 5. The first step involves obtaining a criterion (step 510). Then the type operation being performed is determined (step 520). Based on the type of operation being performed a rule set is then applied (step 525). Then flexible partitioning may be performed based on an applied rule set (step 530).

In one exemplary embodiment, wherein the criterion is to minimize communication in the parallel computing environment, some of the operations, such as math functions, performed on a distributed array may be grouped into different categories for the purposes of determining how arrays should be distributed before, during and/or after the execution of a particular function. Some examples of possible categories include: Functions with Scalar or Small Vector Results, Unary Element-wise and Other Size Preserving Functions, Reduction Functions of One Data Input, Binary Element-wise Functions, Transpose Functions, and Size/Value-Dependent Functions. Each of these category groups will be discussed in more detail below. It should be understood that this is but one possible category grouping and does not cover all possible functions. Other possible functions, categories and groupings will be apparent to one skilled in the art given the benefit of the disclosure.

The category of Functions with Scalar or Small Vector Results includes the functions that return scalar or small vector (length of the output is the same as the number of dimensions of the input) outputs. Examples of functions in this category include:

det, length, isempty, isequal, isreal, ndims, issparse, isscalar, issorted, isvector, norm, numel, rcond, size, isequalwithequalnans.

An example of an associated rule regarding the distribution of the result of a function included in this category is:

The output of the function is replicated.

The category of Unary Element-wise and Other Size Preserving Functions includes functions that have the characteristic such that if:

$$y=\mathrm{fun}(x)$$

then:

the size of the output y is the same as the size of the input x.

Examples of functions in this category include the one input forms of:

abs, acos, acosh, asin, asinh, atan, atanh, ceil, char, conj, cos, cosh, double, exp, fft, fftn, fix, floor, full, ifft, ifftn, imag, int8, int16, int32, int64, isfinite, isinf, isnan, log, log 2, logical, not, pow2, real, reallog, realsqrt, round, sign, sin, single, sink, sort, sparse, sqrt, tan, tanh, tril, triu, uint8, uint16, uint32, uint64, uminus, uplus.

An example of an associated rule regarding the distribution of the result of a function included in this category is:

The distribution scheme of the output is the same as that of the input.

The category Reduction Functions of One Data Input includes functions that have the characteristic such that if:

$$y=\mathrm{fun}(x,\ldots,\mathrm{dim},\ldots)$$

then:

The size of the output y has been "reduced" from that of the input x such that the size of the output y in the dimension dim is 1. In some cases, this shrinks the dimensionality of the output y to less than that of the input x.

Examples of functions in this category include:

all, any, cumprod, cumsum, max, min, prod, sum.

An example of an associated rule regarding the distribution of the result of a function in this category is:

The distribution dimension of the output is the same as that of the data input, even if the reduction function operates down the distribution dimension and the entirety of the output y ends up stored locally on one lab.

The category Binary Element-wise Functions includes functions that have the characteristic such that if:

$$z=\mathrm{fun}(x,y)$$

and the size of the input x is the same as the size of the input y, or one of x and y is a scalar (the scalar expansion case)

then:

the size of the output z is the same as that of x if the inputs are the same size, otherwise the size of the output z is the size of the non-scalar input.

Examples of functions in this category include the two input forms of:

and, bitand, bitcmp, bitget, bitor, bitset, bitshift, bitxor, eq, ge, gt, le, lt, ldivide, max, min, minus, mod, ne, or, plus, pow2, power, rdivide, rem, times, xor.

An example of associated rules regarding the distribution of the result of a function in this category is:

In the case of two same-sized distributed inputs, the distribution scheme of the result y is that of the left-most input x.

In the case of two same-sized inputs, if one is distributed and the other is replicated, then the result is replicated.

For the scalar expansion case, the non-scalar input provides the distribution scheme of the output. If the non-scalar operand is replicated, then the output will also be replicated.

The category of Transpose Functions includes functions that have the characteristic such that if:

$y=\mathrm{fun}(x)$ and:

the size of the input x is m-by-n then:

the size of the output y is n-by-m

Examples of functions in this category include:

transpose, ctranspose.

An example of associated rules regarding the distribution of the result of a function in this category is:

The distribution dimension of the output y is the dimension of the input x that is not distributed. The partition of the output y is the same as that of the input x.

The category Size/Value-Dependent Functions includes functions that have the characteristic such that:

The size of the output cannot be deduced simply from the size of the inputs. Instead, it relies on the value of the inputs. For example:

$A(I1, I2, \ldots, IN) = RHS$ can have any number of impacts on the resulting size of A. Some choices include:

Reduce the size of A in any one dimension.

Increase the size of A in an existing dimension or dimensions.

Increase the number of dimensions of A.

Examples of functions in this category include:

diag, fft, find, permute, reshape, subsasgn, subsref.

An example of associated rules regarding the distribution of the result of a function in this category is the following subset of cases for the function subsref.

$B=A(:)$

For the indexing expression B=A(:), where the size of A is szA, the distribution dimension of A is dim and the partition of A is par.

If dim is the last dimension, then perform the A(:) indexing operation locally.

If dim is not the last dimension, then the indexing operation A(:) may not be performed locally and communication may be required.

In both cases, the distribution dimension of the output B is 1, and the partition of B is given by the MATLAB expression $prod(szA([1:dim-1, dim+1:end]))*par.$ $B=A(:,q)$ If A is a matrix distributed by its second dimension (by columns) and B=A(:,q), where q is a vector of columns selected from A to create B.

If q is a sorted vector in increasing order, then we may perform the indexing operation locally and thereby eliminate communication.

Otherwise, communication may be required to preserve the monotonicity of the columns in the output B.

If q is a sorted vector in increasing order, then the columns of A are left on the labs where they are and B is formed using the distribution scheme that falls out. For example, if there are four labs and A is 10-by-16 with four columns on each lab (the default partition), then B=A(:,12:16) is a 10-by-5 matrix and has a partition of [0 0 1 4].

Forcing B into the default partition of [2 1 1 1] would require moving four of the resulting five columns of B to other labs.

If q is not sorted in increasing order, then the columns of B may move to different labs according to the following algorithm:

First, sort the indices into a new vector sortedQ.

Next, determine how many of those columns of A in sortedQ are on each lab. This determines the partition of B, partitionB.

For example, consider our 10-by-16 matrix A distributed by columns with the default partition from above.

If q=[10 11 16 3 1] then sortedQ=[1 3 10 11 16], defining the partition for B(:,q) as partitionB=[2 0 2 1]

One of ordinary skill in the art will appreciate that the present invention has several advantages. The use of criterion allows for a flexible methodology for guiding the handling of operations on distributed arrays. Providing a pre-defined guiding criterion and relates analysis, rules, and instructions reduces the need for a user to have to specify how to implement flexible partitioning for each instance an operation is preformed. The ability to specify new criterion as well as the underlying analysis, rules, and instructions for flexible partitioning provide a flexible, robust, extensible system for implementing dynamic distribution as new functions, conditions, and situations arise.

It should be understood that the provided embodiments are exemplary in nature. Many alterations and modifications may be made to the present invention, especially the implementations of different criterion and rules, by those having ordinary skill in the art without departing from the spirit and scope of the invention. For example, interpolation and/or extrapolation functionality, such as used for lookup tables, could be implemented using the teachings of the present invention. Therefore, it must be expressly understood that the illustrated embodiments and listed functions have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A non-transitory computer-readable medium to store instructions, the instructions comprising:

one or more instructions that, when executed by at least one processor, cause the at least one processor to:

evaluate a characteristic of a function;

dynamically determine, based on the evaluated characteristic of the function, a partitioning scheme for an input to the function;

partition, based on dynamically determining the partitioning scheme for the input, an array into a plurality of parts;

process the plurality of parts; and produce a result based on the processing.

2. The non-transitory computer-readable medium of claim 1, where:
   a first part of the plurality of parts is contained within a first memory location, and
   a second part of the plurality of parts is contained within a second memory location.

3. The non-transitory computer-readable medium of claim 2, where the first memory location and the second memory location are contiguous.

4. The non-transitory computer-readable medium of claim 1, where the one or more instructions to partition the array into a plurality of parts include:
   one or more instructions that, when executed by the at least one processor, cause the at least one processor to:
      distribute a first part of the array to a first computing unit, and
      distribute a second part of the array to a second computing unit.

5. The non-transitory computer-readable medium of claim 4, where the first and second computing units are within a same processor.

6. The non-transitory computer-readable medium of claim 4, where the first and second computing units are within a same computer.

7. The non-transitory computer-readable medium of claim 4, where the first computing unit is a first processor and the second computing unit is a second processor.

8. The non-transitory computer-readable medium of claim 4, where the first computing unit is within one computer and the second computing unit is within a second computer.

9. The non-transitory computer-readable medium of claim 4, where the first computing unit is a first core of a processor and the second computing unit is a second core of the processor.

10. The non-transitory computer-readable medium of claim 9, where the processor is a graphics processing unit (GPU).

11. The non-transitory computer-readable medium of claim 4, where the first computing unit is a virtual machine and the second computing unit is a virtual machine.

12. The non-transitory computer-readable medium of claim 4, where the first computing unit and the second computing unit reside on a field programmable gate array (FPGA).

13. The non-transitory computer-readable medium of claim 4, where the first computing unit resides on a first field programmable gate array (FPGA) and the second computing unit resides on a second field programmable gate array (FPGA).

14. The non-transitory computer-readable medium of claim 4, where the first part of the array and the second part of the array are contained within contiguous memory locations.

15. The non-transitory computer-readable medium of claim 1, where the one or more instructions to process the plurality of parts include:
   one or more instructions that, when executed by the at least one processor, cause the at least one processor to:
      process at least a portion of a first part of the plurality of parts and a portion of a second part of the plurality of parts simultaneously.

16. The non-transitory computer-readable medium of claim 1, where the dynamically determined partitioning scheme is a default scheme.

17. The non-transitory computer-readable medium of claim 1, where a first part of the plurality of parts is of a first size and a second part of the plurality of parts is of a second size, the second size differing from the first size.

18. The non-transitory computer-readable medium of claim 1, where the one or more instructions to evaluate a characteristic of the function include:
   one or more instructions that, when executed by the at least one processor, cause the at least one processor to:
      evaluate a shape of the array; and
      use the evaluated shape to evaluate the characteristic of the function.

19. The non-transitory computer-readable medium of claim 1, where the one or more instructions to evaluate a characteristic of the function include:
   one or more instructions that, when executed by the at least one processor, cause the at least one processor to:
      evaluate a category of the function; and
      use the evaluated category to evaluate the characteristic of the function.

20. The non-transitory computer-readable medium of claim 1, further comprising:
   one or more instructions that, when executed by the at least one processor, cause the at least one processor to:
      distribute the result.

21. A device comprising:
   a memory to store instructions; and
   a processor to execute the instructions to:
      evaluate a characteristic of a function;
      dynamically determine, based on evaluating the characteristic, a partitioning scheme for an input to the function;
      partition, based on dynamically determining the partitioning scheme for the input, an array into a plurality of parts;
      process the plurality of parts; and
      produce a result based on the processing.

22. A method comprising:
   dynamically determining, based on at least one characteristic of a function, an input distribution scheme for an input to the function,
      the function being one of a plurality of functions in a function library, and
      the dynamically determining being performed by a computing device; and
   distributing, based on the dynamically determined input distribution scheme, portions of the input to a plurality of computing units for processing,
      the distributing being performed by the computing device.

23. The method of claim 22, where:
   a first portion of the distributed portions of the input is contained within a first memory location, and
   a second portion of the distributed portions of the input is contained within a second memory location.

24. The method of claim 23, where the first memory location and the second memory location are contiguous.

25. The method of claim 22, where the plurality of computing units are within a same processor.

26. The method of claim 22, where the plurality of computing units are within a same computer.

27. The method of claim 22, where a first computing unit of the plurality of computing units is a first processor and a second computing unit of the plurality of computing units is a second processor.

28. The method of claim 22, where a first computing unit of the plurality of computing units is within a first computer and a second computing unit of the plurality of computing units is within a second computer.

29. The method of claim 22, where a first computing unit of the plurality of computing units is a first core of a processor and a second computing unit of the plurality of computing units is a second core of the processor.

30. The method of claim 29, where the processor is a graphics processing unit (GPU).

31. The method of claim 22, where the plurality of computing units are virtual machines.

32. The method of claim 22, where the plurality of computing units are within a field programmable gate array (FPGA).

33. The method of claim 22, where a first computing unit of the plurality of computing units is a field programmable gate array (FPGA) and a second computing unit of the plurality of computing units is a second field programmable gate array (FPGA).

34. The method of claim 22, where the input distribution scheme is a default scheme.

35. The method of claim 22, where a first portion of the distributed portions of the input is of a first size and a second portion of the distributed portions of the input is of a second size, the second size differing from the first size.

36. The method of claim 22, where the at least one characteristic of the function is a shape of the input.

37. The method of claim 22, where the at least one characteristic of the function is a category of the function.

38. The method of claim 22, where the function library is part of a computer programming environment.

* * * * *